United States Patent Office 3,307,933
Patented Mar. 7, 1967

3,307,933
COMPOSITION AND METHOD FOR CONTROLLING PLANT GROWTH
Klaus Sasse, Cologne-Stammheim, Richard Wegler, Leverkusen, Ludwig Eue, Cologne-Stammheim, and Helmuth Hack, Opladen, Germany, assignors to Farbenfabriken Bayer Aktiengesellschaft, Leverkusen, Germany, a German corporation
No Drawing. Filed July 28, 1964, Ser. No. 385,754
Claims priority, application Germany, Sept. 10, 1963, F 40,716
4 Claims. (Cl. 71—2.3)

The present invention relates to the use of known dichlorobenzyl cyanides for controlling, especially suppressing, plant growth.

It is known that chlorinated phenylacetic acids exert an effect on plant growth comparable to that of chlorophenoxyacetic acids. The comparison of the various isomeric mono- and poly-chlorophenylacetic acids in a growth test reveals that those phenylacetic acids possess a normal activity which contain chlorine in one or both o-positions of the phenyl radical [see Chem. Abstracts, 48, 6398 (1954); Nature, 182, 1094 (1958); Ann. Appl. Biol., 47, 593 (1959); Chem. Abstr., 54, 12052 (1960)]. Since many growth-controlling substances lead to damage or destruction of plants when employed in excessive doses, 2,3,6-trichlorophenylacetic acid has been proposed as the most effective polychlorophenylacetic acid for combating weeds. Because of its two o-positioned chlorine atoms, this compound is said to be better suited than the 2,4,5-trichlorophenylacetic acid known for this purpose already for a long time.

The mono- and poly-chlorobenzyl cyanides have hitherto not been examined for their growth-controlling activity. It is only known that 2,3,6-trichlorobenzyl cyanide would hardly be suitable as a weed control agent (cf. German published patent application 1,136,871, page 11, lines 54–59).

It is an object of the present application to provide new agents for influencing plant growth. A further object of the invention consists in providing mixtures for influencing plant growth, which, besides a primary active agent, contain a further substance obtained together with the primary agent in the production thereof. Further objects will be apparent from the following description and the examples.

It has now been found that 2,3-dichlorobenzyl cyanide of the formula (I) 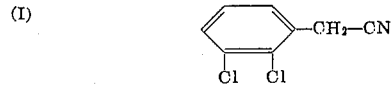

as well as mixtures thereof with 3,4-dichlorobenzyl cyanide (preferably up to 85% by weight) of the formula (II) 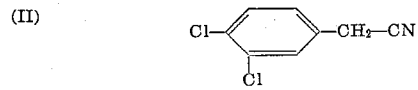

possess strong plant growth controlling, particularly herbicidal, properties.

It is to be regarded as very surprising that 2,3-dichlorobenzyl cyanide shows strong plant growth influencing properties, since it contains only one chlorine atom in the o-position to the cyanomethyl group. Moreover it is to be regarded as surprising that the herbicidal properties of 2,3-dichlorobenzyl cyanide are stronger than those of the 2,3,6-trichlorophenylacetic acid known for the same purpose, which contains chlorine atoms in both o-positions.

To produce the isomerically pure di- and trichlorophenylacetic acids or their nitriles, multiple-step chemical operations are generally required. In the art, use is therefore made of shortened methods of synthesis, which then, however, require subsequent separation of the isomers since the less active or inactive isomers mostly give rise to a stronger reduction of the herbicidal properties than would be expected according to their proportion in the mixtures.

The production of pure 2,3-dichlorobenzyl cyanide is also rather expensive. Starting from 3-chloro-2-aminotoluene it can be carried out, for example, in the following way:

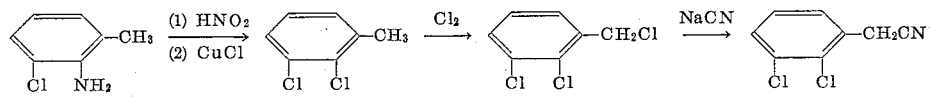

The 2,3-dichlorobenzyl cyanide thus obtainable is a crystalline substance which melts at 60° C.

A process which is technically readily performable has now been found by which 2,3-dichlorobenzyl cyanide can be produced in a simple manner and in good yields in admixture with 3,4-dichlorobenzyl cyanide. It was hitherto assumed that chloromethylation of o-dichlorobenzene would result in isomerically pure 3,4-dichloro-benzyl chloride. The gas chromatographic examination of the reaction product formed from o-dichlorobenzene, formaldehyde and hydrogen chloride (Houben-Weyl, volume V/3, page 1003, 4th edition, 1962) has shown, however that it is a mixture of 2,3-dichlorobenzyl chloride and 3,4-dichlorobenzyl chloride.

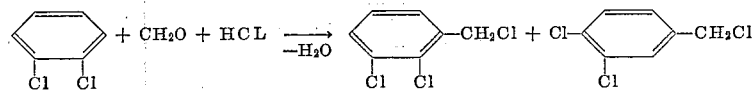

The mixtures of 2,3- and 2,4-dichlorobenzyl cyanides obtainable from these dichlorobenzyl chloride mixtures by reaction with salts of hydrocyanic acid show surprisingly good herbicidal properties similar to those of pure 2,3-dichlorobenzyl cyanide, although pure 3,4-dichlorobenzyl cyanide exerts only a small influence on the growth of plants. Costly separation of the more highly effective isomer can therefore be dispensed with.

The substances according to the invention influence plant growth and can therefore be employed as defoliants, desiccants, germination inhibitors and particularly as weed killers. By weeds in the broadest sense, all plants are to be understood which grow in places where they are not desired. Whether the substances of the present invention act as total or as selective herbicides depends mainly on the amount applied.

The substances of the present invention can be employed for instance with the following plants: dicotyledons such as mustard (Sinapis), chickweed (Stellaria), French weed (Galinsoga), cotton (Gossypium), beet (Beta), potatoes (Solanum); monocotyledons such as cat's tail (Phleum), meadow grass (Poa), millet (Echinochloa), oats (Avena), and wheat (Triticum).

In this list the types of plants given are to be understood as representative examples of the genera identified in Latin. The use of the substances according to the invention is however in no way to be limited to these genera but extends in the same way to other plants.

The substances according to the invention can be converted into the usual formulations, such as emulsifiable concentrates, spray powders, pastes, soluble powders, dusting agents and granulates. They are produced in known manner, e.g. by extending the active agents with solvents and/or carriers, optionally with the use of emulsifiers and/or dispersing agents (see Agricultural Chemicals, March 1960, pages 35–38). As assistants the following are mainly to be used: solvents such as aromatics (e.g. xylene), chlorinated aromatics (e.g. chlorobenzenes), paraffins (e.g. mineral oil fractions), alcohols (e.g. methanol), amines (e.g. ethanolamine); and also water; carriers, such as natural ground stone (e.g. kaolins, chalk) and synthetic stone meal (e.g. highly disperse silicic acid); emulsifiers, such as non-ionic and anionic emulsifiers (e.g. polyoxyethylene-fatty acid esters, alkyl sulphonates), and dispersing agents such as lignin.

The active agents according to the invention can be present in the formulations in admixture with other known active substances, such as sodium chlorate, trichloracetic acid, 2,4-dichlorophenoxyacetic acid, 2,4,5-trichlorophenoxyacetic acid, 2-methyl-4-chlorophenoxyacetic acid, 4-chlorophenyldimethyl urea, 2,4-bisethylamino-6-chlorotriazine, 3-amino-1,2,4-triazole, and 2,3,6-trichlorobenzoic acid.

The formulations contain in general between 0.1 and 95 percent by weight of active substance, preferably between 0.5 and 90.

The highest activity is developed by 2,3-dichlorobenzyl cyanide when applied before emergence of the plants. In various cases it can however also be employed for destroying already germinated plants.

The active substances can be used as such in the form of their formulations, or in the form prepared therefrom for application. They are used in the usual way, e.g. by sprinkling, spraying and dusting.

The amounts in which the 2,3-dichlorobenzyl cyanide is expediently employed, depends on a number of factors, but especially on the type of plant to be destroyed. In general, amounts between 1 and 10, preferably between 2 and 6 kg./ha., are used.

The following examples are given for the purpose of illustrating the invention.

*Example*—Pre-emergence test

Solvent: 10 parts by weight acetone.
Emulsifier: 5 parts by weight alkylaryl polyglycol ether.

To produce a suitable preparation of active compound, 1 part by weight of active compound is mixed with the stated amount of solvent, the stated amount of emulsifier is added, and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area is decisive. After three weeks, the degree of damage to the plants is determined and characterised by the values 0–5, which have the following meanings:

0—No effect
1—Slight damage or delay in growth
2—Marked damage or inhibition of growth
3—Heavy damage and only deficient development, or only 50% emerged
4—Plants partially destroyed after germination or only 25% emerged
5—Plants completely dead or not emerged.

The active compounds, the amounts applied and the results obtained can be seen from the following table:

TABLE.—PRE-EMERGENCE TEST

| Active substance | Agent used in kg./ha. | Millet | Beet | Oats | Cotton | Wheat | Mustard |
|---|---|---|---|---|---|---|---|
| 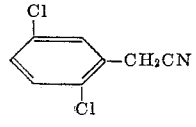 (2,3-dichloro) | 2.5 | 3 | 2 | 1 | 1 | 2 | 3 |
| 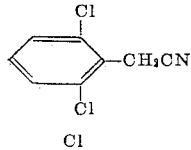 (2,6-dichloro) | 2.5 | 4 | 4 | 1 | 1 | 3 | 3 |
| 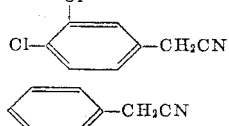 (2,4-dichloro) | 2.5 / 5.0 | 4 / 4 | 0 / 5 | 0 / 1 | 0 / 0 | 0 / 1 | 0 / 1 |
| 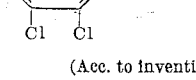 (3,5-dichloro) (Acc. to Invention.) | 2.5 / 5.0 | 4 / 4–5 | 5 / 5 | 3 / 4 | 4 / 4–5 | 4 / 4 | 4–5 / 5 |

TABLE.—PRE-EMERGENCE TEST—Continued

| Active substance | Agent used in kg./ha. | Millet | Beet | Oats | Cotton | Wheat | Mustard |
|---|---|---|---|---|---|---|---|
| 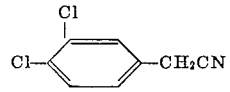 (A) 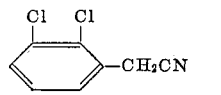 (B) Mixture A:B=76.3:23.3 wt. %. (Acc. to invention.) | 2.5 5.0 | 4 4-5 | 5 5 | 2 4 | 2 4 | 3 4 | 4 5 |
| 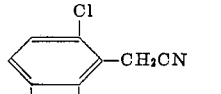 | 5.0 | 4 | 4 | 3 | 1 | 4 | 4 |
| 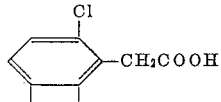 | 5.0 | 4-5 | 5 | 3 | 0 | 2 | 4-5 |

We claim:
1. A method for controlling the growth of plants which comprises applying to said plants an effective amount of a mixture consisting essentially of
(A) 2,3-dichlorobenzyl cyanide and 0–85% by weight of active ingredients of
(B) 3,4-dichlorobenzyl cyanide.
2. The method of claim 1 wherein the 2,3-dichlorobenzyl cyanide is applied to the soil in a concentration of about 1–10 kg./hectare.
3. The method of claim 1 wherein the ratio of (A) to (B) in the mixture is about 7:2 parts by weight and the mixture is applied to the soil in a concentration of about 1–10 kg./hectare.
4. A herbicidal composition consisting essentially of (A) 2,3-dichlorobenzyl cyanide and (B) 3,4-dichlorobenzyl cyanide, the ratio of (A) to (B) being about 7:2 parts by weight.

References Cited by the Examiner
UNITED STATES PATENTS
2,790,819    4/1957    Godfrey _____ 71—2.3 XR FOREIGN PATENTS
160,160    12/1954    Australia.
97,486    3/1961    Netherlands.

OTHER REFERENCES
Chiavarelli: Chemical Abstracts, vol. 52, p. 3832 (1958).
Houben et al., vol. V/3, page 1003 (4th edition, 1962).

ELBERT L. ROBERTS, *Primary Examiner.*

JAMES O. THOMAS, Jr., LEWIS GOTTS, *Examiners.*

ALBERT J. ADAMCIK, *Assistant Examiner.*